(12) United States Patent  
Desanti

(10) Patent No.: US 8,621,095 B1  
(45) Date of Patent: Dec. 31, 2013

(54) FIBRE CHANNEL VIRTUALIZATION ZONE

(75) Inventor: Claudio Desanti, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 191 days.

(21) Appl. No.: 13/330,747

(22) Filed: Dec. 20, 2011

(51) Int. Cl.
*G06F 15/16* (2006.01)

(52) U.S. Cl.
USPC .......................................... 709/229; 709/224

(58) Field of Classification Search
USPC ........................................ 709/223–224, 229
See application file for complete search history.

(56) References Cited

U.S. PATENT DOCUMENTS

| | | | |
|---|---|---|---|
| 2006/0036736 A1* | 2/2006 | Kitamura et al. | 709/226 |
| 2006/0059540 A1* | 3/2006 | Hammons et al. | 726/2 |
| 2006/0190611 A1* | 8/2006 | Miyazaki et al. | 709/229 |
| 2007/0106992 A1* | 5/2007 | Kitamura | 718/104 |
| 2010/0085981 A1* | 4/2010 | Gupta et al. | 370/419 |
| 2010/0226281 A1* | 9/2010 | Ghosh et al. | 370/254 |
| 2012/0155469 A1* | 6/2012 | Majumdar et al. | 370/392 |

OTHER PUBLICATIONS

American National Standard for Information Technology, "Fibre Channel—Generic Services- 6 (FC-GS-6)," New York, NY, Jul. 22, 2009.
American National Standard for Information Technology, "Fibre Channel-Switch Fabric-5 (FC-SW-5)," New York, NY, Jun. 3, 2009.

* cited by examiner

*Primary Examiner* — Philip B Tran
(74) *Attorney, Agent, or Firm* — Edell, Shapiro & Finnan, LLC

(57) ABSTRACT

Techniques are provided for management of virtual machines in a Fiber Channel (FC) network that comprises a switched fabric having a plurality of switch ports (disposed in one or more switches). In accordance with one example, a Fabric Login (either FLOGI or FDISC) request is received, on a first switch port, from a first virtual machine. A determination is made as to whether the first virtual machine is currently logged into the switched fabric via a second switch port. If the first virtual machine is currently logged into the switched fabric via a second switch port, a determination is made as to whether the first virtual machine is an element (or part) of a virtualization zone defined for the switched fabric. If the first virtual machine is an element of the virtualization zone, the Fabric Login request is accepted from the first virtual machine via the first switch port and the first virtual machine is logged out of the switched fabric at the second port.

20 Claims, 7 Drawing Sheets

FIBRE CHANNEL VIRTUALIZATION ZONE

TECHNICAL FIELD

The present disclosure relates generally to Fibre Channel networks.

BACKGROUND

Fibre Channel (FC) is a high-speed network technology and protocol suite used to implement storage area networks (SAN). A purpose of the FC protocol suite is to efficiently manage large numbers of storage devices using serial interfaces operating over optical or electrical interfaces. FC provides an efficient and dependable means for transferring data between workstations, mainframes, supercomputers, desktop computers, and storage devices.

Recent developments have extended Fibre Channel to Ethernet. Fibre Channel over Ethernet (FCoE) is a protocol that leverages Ethernet extensions to enable the establishment of lossless connections between two Ethernet nodes. The FCoE protocol uses such lossless connections. More specifically, native FC frames are encapsulated in Ethernet frames such that Ethernet becomes the physical interface and FC becomes the transport protocol. At an Ethernet receiving node, the native FC frames are de-encapsulated from the Ethernet frames and then processed in accordance with the FC protocol. By deploying the lossless capability in Ethernet, FC can be extended to Ethernet-capable network devices, thereby increasing the reach of FC connected devices. As such, FC networks may use native FC or FCoE as the underlying transport protocol.

A storage area network (SAN) is used to connect host devices (e.g., servers, computers, etc.) to one or more shared storage devices. The network part of a SAN based on Fibre Channel is called FC switched fabric. A switched fabric comprises one or more FC switches that are deployed to direct traffic between the host devices and the storage devices. The host devices perform computations and/or provide services, usually through a network connection to a wide area network (WAN) (e.g., the Internet, Intranet, etc.) or a local area network (LAN).

DESCRIPTION OF EXAMPLE EMBODIMENTS

Overview

Techniques are provided for management of virtual machines in a Fibre (Fiber) Channel (FC) network that comprises a switched fabric having a plurality of switch ports (disposed in one or more switches). In accordance with one example, a Fabric Login (either FLOGI or FDISC) request is received, on a first switch port from a first virtual machine. A determination is made as to whether the first virtual machine is currently logged into the switched fabric via a second switch port. If the first virtual machine is currently logged into the switched fabric via a second switch port, a determination is made as to whether the first virtual machine is an element (or part) of a virtualization zone defined for the FC network. If the first virtual machine is an element of the virtualization zone, the Fabric Login request is accepted from the first virtual machine via the first switch port and the first virtual machine is logged out of the switched fabric at the second port.

EXAMPLE EMBODIMENTS

Figure 1:
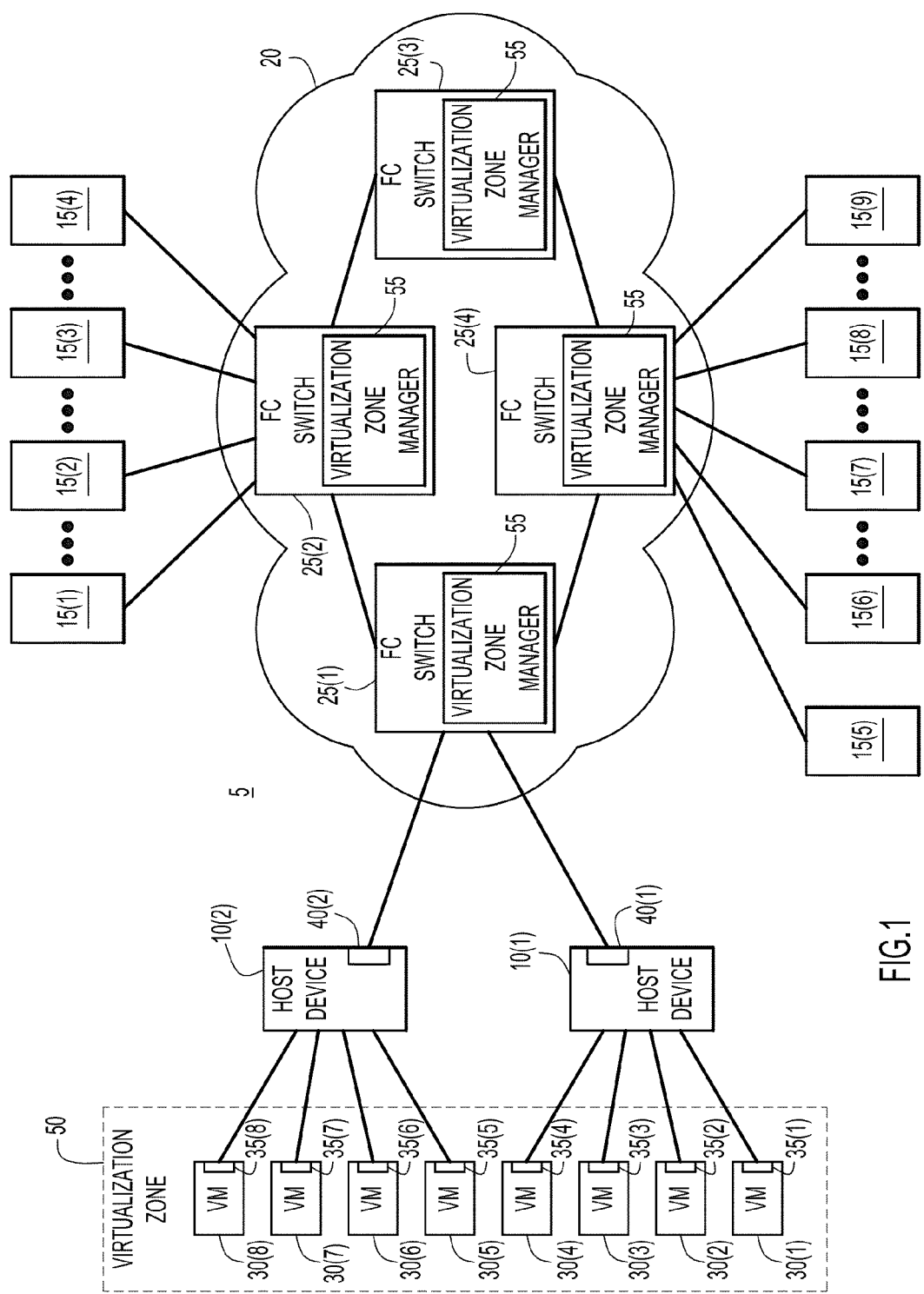
FIG. 1 is a block diagram of a storage area network (SAN) implementing virtualization zoning techniques.

FIG. 1 is a block diagram of an example FC storage area network (SAN) that is generally shown at reference numeral 5. FC SAN 5 may use native FC or FCoE as the underlying transport protocol. For ease of illustration, examples will be described herein with reference to native FC as the transport protocol.

In the example of FIG. 1, FC SAN 5 comprises first and second host devices 10(1) and 10(2), respectively, and a plurality of storage devices, e.g., storage devices 15(1)-15(9). The host devices 10(1) and 10(2) are connected to one or more of storage devices 15(1)-15(9) by an FC switched fabric (simply FC Fabric), schematically represented by cloud 20. FC fabric comprises FC switches 25(1)-25(4). The SAN 5 also comprises a plurality of virtual machines (VMs) 30(1)-30(8) each having a virtual port 35(1)-35(8), respectively. Host devices 10(1) and 10(2) each comprise a host port 40(1) and 40(2), respectively. The numbers of storage devices, host devices, and VMs shown in FIG. 1 are only examples and should be considered limiting.

Host devices 10(1)-10(2) and virtual machines 30(1)-30(8) are collectively referred to as "initiators" because they initiate read or write transactions with the storage devices 15(1)-15(9). Storage devices 15(1) and 15(2) are referred to as "targets" because they receive the commands sent from the initiators.

In certain circumstances, FC SAN 5 may be partitioned into smaller subsets or groups in order to, for example, restrict communication, add security, and to simplify management. This partitioning of FC SAN 5 is referred to herein as FC zoning, or simply zoning. Zoning is enforced by FC Fabric 20. A "zone" is a list of nodes (initiators and targets) that are allowed to communicate with each other. Since a zone is a logical grouping, nodes may simultaneously be in different zones.

Virtual machines 30(1)-30(8) are virtual machines residing on one or more physical servers, computers, or host devices 10(1) and 10(2). For ease of illustration, virtual machines 30(1)-30(8) are shown separate from host devices 10(1)-10(2). As described in further detail below, virtual machines 30(1)-30(8) connect to switched fabric 20 through host devices 10(1) and 10(2) and, more particularly, through a physical port of the host devices. That is, the virtual ports 35(1)-35(4) and the virtual ports 35(5)-35(8) are multiplexed through the physical ports 40(1) and 40(2) of host devices 10(1) and 10(2), respectively, so that switch 25(1) perceives eight (8) different ports/virtual machines.

In an FC SAN, such as FC SAN 5, the first activity performed by an initiator (e.g., host devices 10(1)-10(2) and/or virtual machines 30(1)-30(8)) is to perform a Fabric Login procedure in order to acquire an FC address identifier (N_Port_ID). The first Fabric Login uses a message called FLOGI, the subsequent ones, intended to acquire additional N_Port_IDs without changing other login parameters, use a message called FDISC. The term Fabric Login, as used herein, indicates either message type. During a Fabric Login procedure, the initiator port (e.g., a node port, also referred to as an N_Port) sends a Fabric Login request (either FLOGI or FDISC) that declares the identity of the initiator to the switched fabric 20 through a unique port name (N_Port_Name). The N_Port_Name is the identifier for the port that the initiator uses to connect to the switched fabric 20. In response to receipt of the port identity (i.e., N_Port_Name), the receiving switch within the switched fabric (e.g., switch 25(1)), responds to the initiator with a Fabric Login acceptance that includes an FC address identifier (N_Port_ID). For example, as shown in FIG. 1, virtual machine 30(1) transmits a message including its identity (N_Port_Name) to FC switch 25(1). FC switch 25(1) then provides virtual machine 30(1) with a message containing an N_Port_ID.

The Fabric Login process assumes that each node port has a unique N_Port_Name and problems can arise when this uniqueness is not respected. This may occur, for example, when a switch receives a Fabric Login request, on a first port, from a node port that is already logged into the switched fabric through a different port. In circumstances when a node is physically disconnected from a switch port and reconnected to another switch port, the disconnection of the node port is signaled by the physical layer to the involved switch. As such, the switch performs an implicit logout of the disconnected node port from the switched fabric. In this way, when the node port is reconnected, its identity is no longer registered within the switched fabric and a new Fabric Login process can be performed.

Node port virtualization, both in native Fibre Channel and in FCoE, complicates the normal Fabric Login process. More specifically, as shown in FIG. 1, using node port virtualization, the ports 35(1)-35(8) of virtual machines 30(1)-30(8) are multiplexed through the ports 40(1) and 40(2) for communication with switch 25(1). That is, a single switch port (F-Port) is connected to multiple virtual node ports (VN_Ports), and each virtual node port may be associated with a different virtual machine. In certain circumstances, a virtual machine may "hang" (i.e., pause or stop operating properly) and then be restarted on a different server in order to keep its service running. However in this situation there is no physical layer interruption because the physical port through which the virtual node port is multiplexed remains connected to the switch port, and the switch cannot use that indication to implicitly logout the virtual node port associated with the hung virtual machine. As such, when the virtual machine is restarted on the different server, the Fabric Login process results in an identifier that appears as a duplicate to the switch. In other words, if there is no disconnection of the virtual node port from the physical layer perspective, receiving a Fabric Login request on another switch port is usually interpreted by the switch as a security threat (i.e., the switch interprets the second Fabric Login as a node port trying to impersonate another node port). Therefore, the switch rejects the second Fabric Login and movement of a hanged virtual machine is not possible.

In an FCoE environment, the use of virtual port keep alive messages may help to resolve the situation. For example, after a virtual machine hangs, the virtual machine may no longer generate any more of these keep alive messages. In this case, after a predetermined time period (e.g., 2.5 times the keep alive message period or 225 seconds in one example) the virtual node port or the virtual link can be de-instantiated by the switch and the virtual node port can be recovered. However, a disruption in service of 225 seconds is not negligible, and there is no guarantee that all failure modes of a virtual machine will result in the ceasing of these periodic keep alive messages.

In native FC, the situation is more problematic because there are no virtual port keep alive messages. The only mechanism used by native FC to detect a disconnection is the indication from the physical layer. As noted above, if the physical layer continues to operate, a system may be hanged for an indeterminate period of time. As such, when virtualization is deployed, there is a need for techniques to override, in a controlled manner, the default security behavior in which a duplicated Fabric Login is rejected. Such techniques would better support virtualized environments.

Examples described herein enable such techniques through the definition of a "virtualization zone". A virtualization zone is a zone in which virtual machines are identified so that duplicate Fabric Logins, resulting from movement of the virtual machines, may be properly managed.

In a FC Fabric, zones are defined (through zone definitions) and grouped in Zone Sets, maintained by the FC Fabric, and, at any time, one of the Zone Sets is the one enforced by the Fabric. The Zone Set currently enforced by the Fabric is called the active Zone Set, the other Zone Sets are collectively referred to as a Zone Set database. In the Zone Set Database, each Zone Set is identified by a Zone Set name and contains a list of references to zone definitions. Each zone definition is identified by a zone name and includes a list of zone members. A zone definition may also include a reference to a zone attribute object that defines a list of attributes that can be associated with the zone and that can modify the zone enforcement rules. Zone attributes are used to specify additional characteristics of a zone that provide additional behaviors in addition to the fundamental one described above. Zone attributes may provide additional parameters. Current FC standards define four zone attributes: protocol attribute, used to restrict the zone to a certain protocol (specified as a parameter of the attribute), hard zone attribute, used to specify frame by frame enforcement (without parameter), broadcast zone attribute, used to specify additional constraints on broadcast frames processing (without parameter), and Inter-Fabric zone (IFR) zone, used to identify an Inter-Fabric zone (without parameter).

Zones are generally defined as a list of port identifiers (N_Port_Names) that are able to communicate with each other. A virtualization zone is a list of port identifiers (N_Port_ Names) used by a group of virtual machines (i.e., ports used for virtualization purposes) that can be moved around between host devices. As such, a virtualization zone does not enable any communication among the listed zone members. The semantic of a virtualization zone is identifying a group of N_Port_Names belonging to virtual machines and that can be moved around. A virtualization zone is schematically shown by box 50 in FIG. 1, and is defined to include a list of the port names for virtual machines 30(1)-30(8). Virtualization zone 50, and the related Fabric Login operations, are controlled by a virtualization zone manager 55 in switch 25(1). A virtualization zone is defined through a virtualization zone attribute (i.e., a virtualization zone is a zone defined to have a virtualization zone attribute).

Figure 2A:
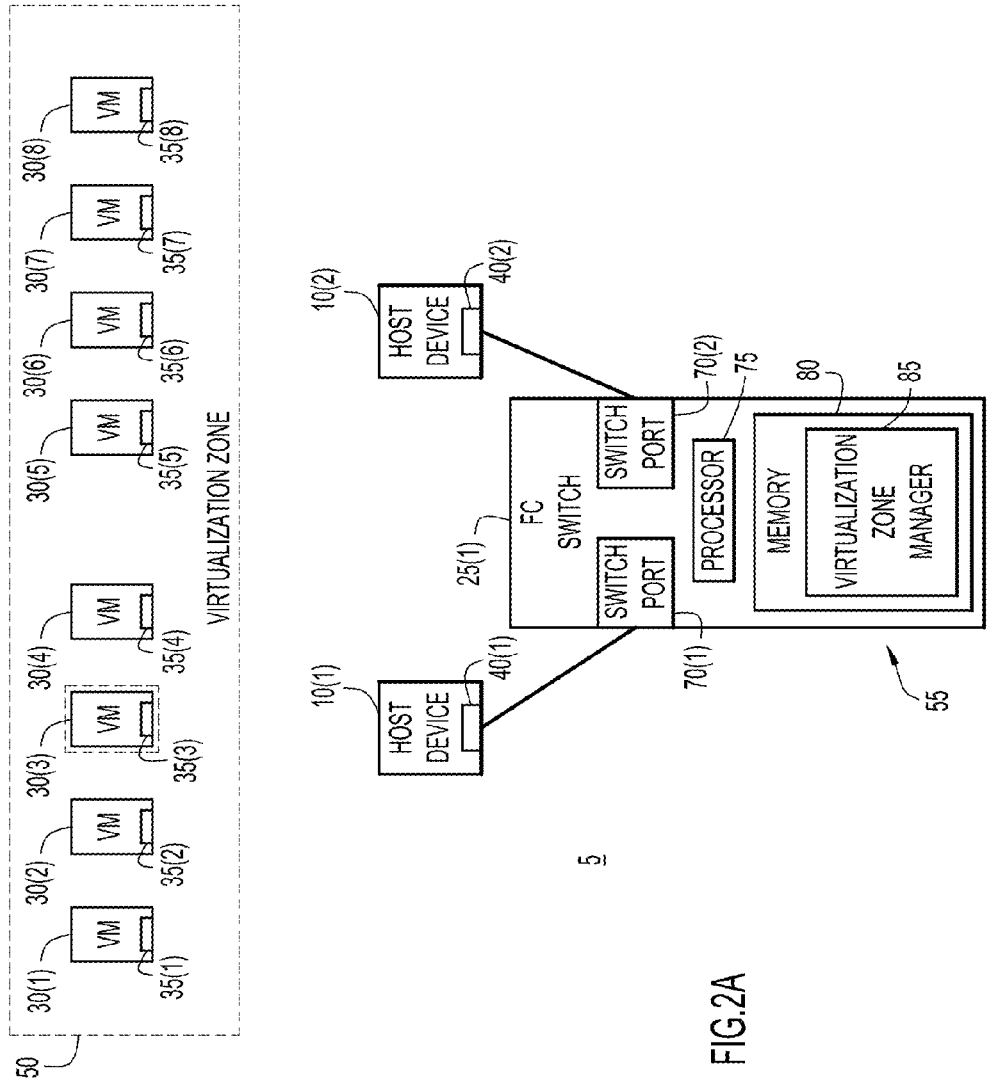
FIGS. 2A-2C are block diagrams of a portion of the SAN of FIG. 1 illustrating virtualization zoning techniques.
Figure 2B:
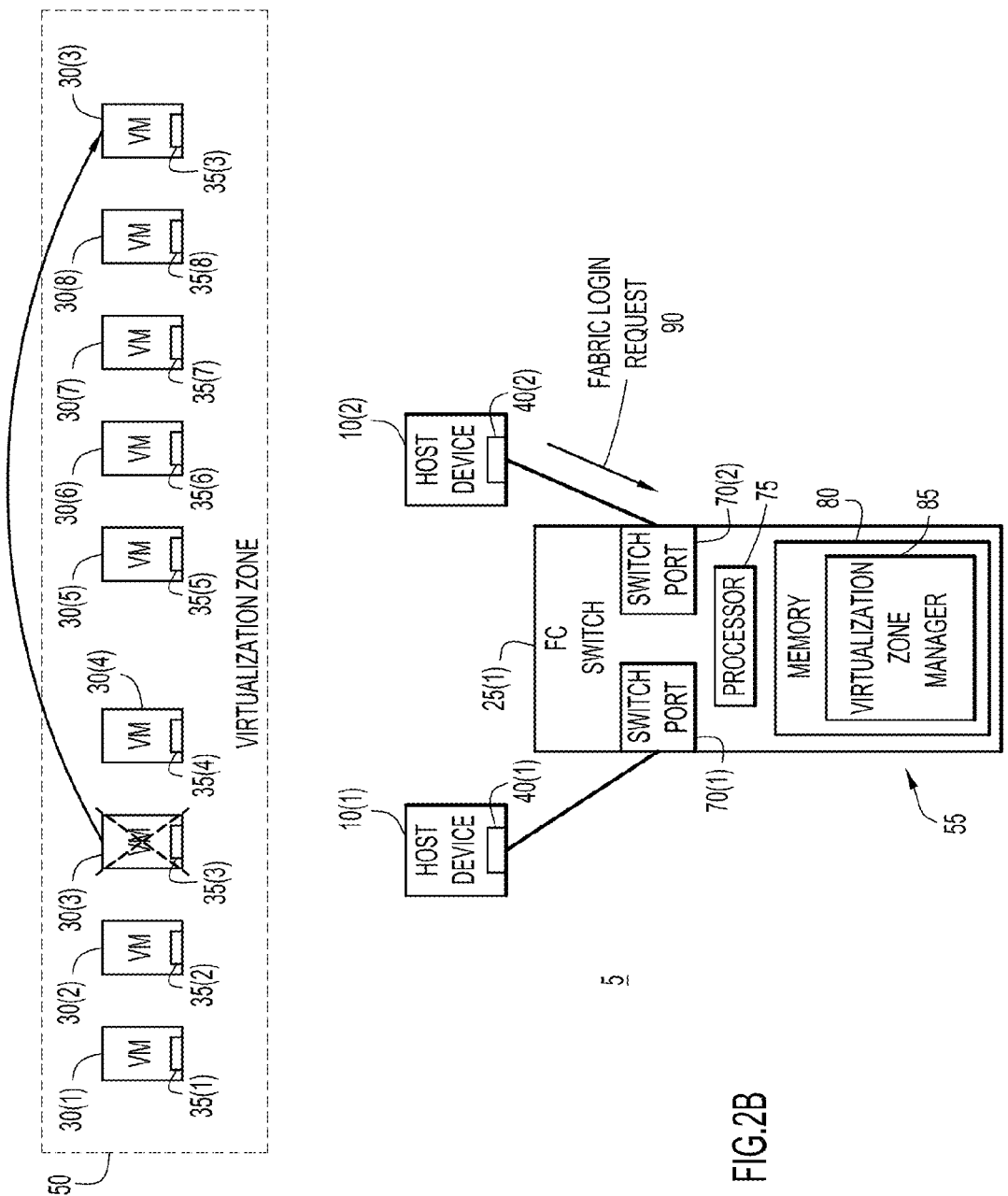
Figure 2C:
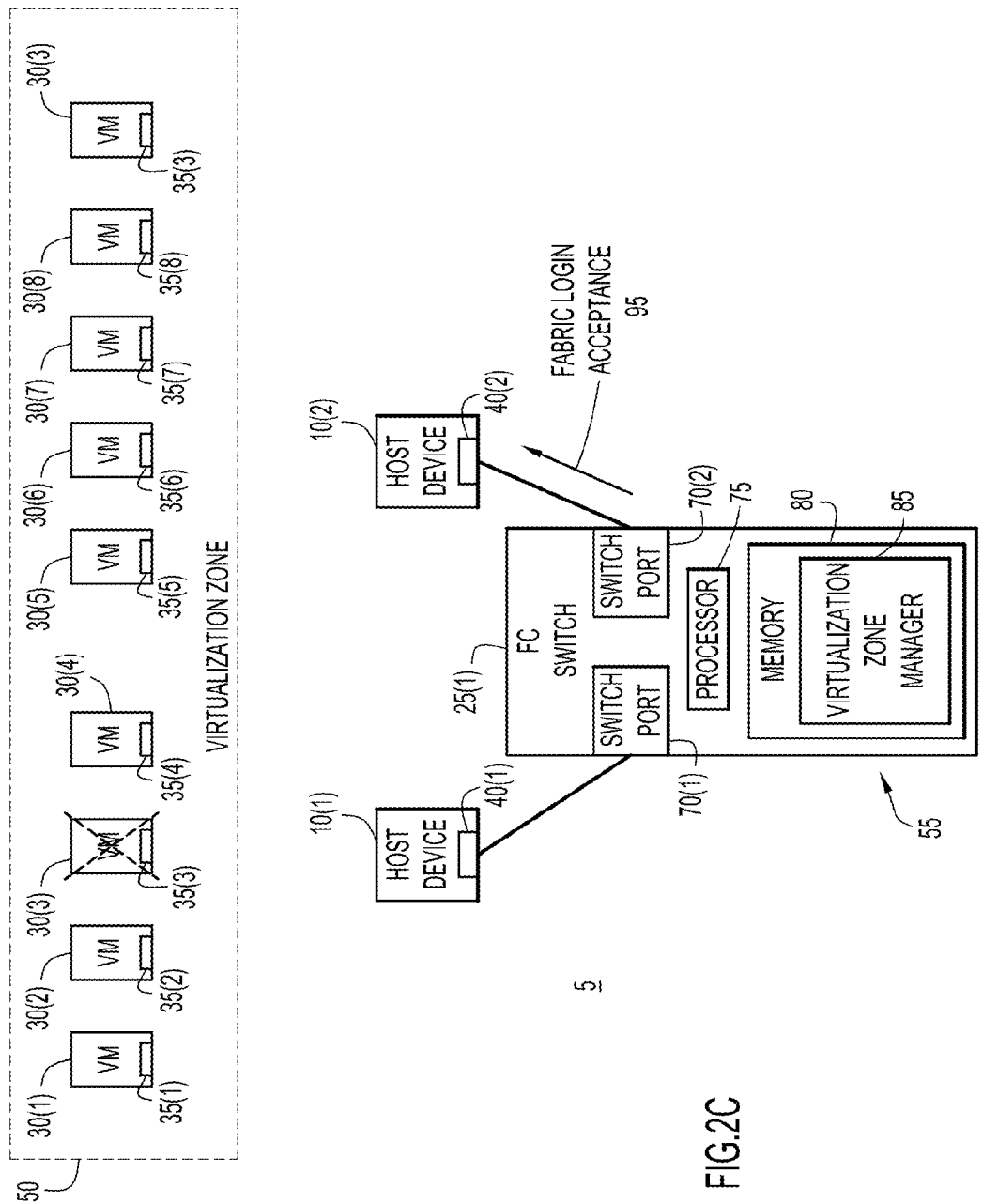

FIGS. 2A-2C illustrate further details of virtualization zone 50 and the related Fabric Login operations. In these examples, FC switch 20(1) comprises first and second switch ports 70(1) and 70(2), respectively, a processor 75, and a memory 80 comprising virtualization zone management logic 85. For ease of illustration, only switch 25(1) is shown in FIGS. 2A-2C and the other elements of switched fabric 20 have been omitted.

FIGS. 2A-2C illustrate virtual machines 30(1)-30(8) with virtual node ports 35(1)-35(8), respectively. As noted above, virtual node ports 35(1)-35(4) and virtual node ports 35(5)-35(8) are multiplexed through host device ports 40(1) and 40(2), respectively, for communication with FC switch 20(1). For ease of illustration, connections between virtual machines 30(1)-30(8) and host devices 10(1) and 10(2) have been omitted.

In the example of FIG. 2A, virtual machine 30(3), initially logged into switched fabric 20 through host device 10(1) (i.e., through port 40(1)), experiences a problem that causes the machine to hang. After virtual machine 30(3) hangs, the virtual machine can be moved, as shown in FIG. 2B, and restarts on the second host device 10(2) in order to keep its service running. As such, virtual machine 30(3) transmits a new Fabric Login request 90 that declares its identity to the switched fabric 20 through a unique port name (N_Port_Name). Fabric Login request 90 is received by switch 25(1) via second switch port 70(2). Due to the fact that there is no disconnection of virtual node port 35(3) from the physical layer perspective, in a conventional arrangement, receipt of this new Fabric Login request 90 would be interpreted as a security threat. However, in the example of FIG. 2B, virtualization zone manager 55 is configured to make a determination as to whether the virtual machine that sent the request (i.e., virtual machine 30(3)) is currently logged into the switched fabric 20 via a different switch port (e.g., switch port 70(1) or a switch port on another switch). In the example of FIG. 2B, virtualization zone manager 55 determines that virtual machine 30(3) is currently logged into switched fabric 20 via switch port 70(1).

Once it is determined that the virtual machine 30(3) is logged into the switched fabric 20 via a different switch port, virtualization zone manager 55 then is configured to determine if virtual machine 30(3) is an element (or part) of virtualization zone 50. This determination may be made, for example, by comparing the port identifier in the Fabric Login request 90 to the list of port names associated with the virtualization zone 50. If virtual machine 30(3) is an element of the virtualization zone 50, switch 25(1) is configured to accept the Fabric Login request 90 and transmit a Fabric Login acceptance 95 (i.e., a message providing virtual machine 30(3) with an FC address identifier) back to virtual machine 30(3). Transmission of the Fabric Login acceptance 95 is shown in FIG. 2C. If virtual machine 30(3) is an element of the virtualization zone 50, switch 25(1) is also configured to log virtual machine 30(3) out of the switched fabric 20 at switch port 70(1).

In other words, upon receiving a duplicated Fabric Login, switch 25(1) can check if the port identifier carried by the Fabric Login request 90 belongs to the virtualization zone 50. If so, then the second Fabric Login request 90 will be accepted and the existing one will be implicitly logged out, effectively achieving a move of the involved virtual node port. If not, then the second Fabric Login request 90 will be rejected, according to the existing security driven behavior. Risks associated with the use of the virtualization zone 50 may be mitigated or resolved by requiring the use of one of the FC Authentication protocols specified in the Fibre Channel-Security Protocol (FC-SP) and FC-SP-2 standards.

Management of zoning configurations in an FC Fabric is usually performed through a management function provided by each Fibre Channel switch. This management function is referred to as the Fabric Zone Server. This function can be accessed through a protocol called Common Transport (CT). Using this protocol a management station (which is just another FC node) is able to access the Fabric Zone Server through a set of commands in order to define and manage zones. Basically, when a host sends a frame to the management service well known address, that frame is processed by the switch directly connected to the host in order to provide the abstraction of a Fabric service. For the Fabric Zone Server, that switch also performs some Fabric actions (i.e., switch to switch communications) to ensure that every other switch of the Fabric has the same information (i.e., the same zone definition), in order to ensure consistent fabric behavior. In the example of FIGS. 1 and 2A-2C, the Fabric Zone Server is represented by virtualization zone manager 55.

Virtualization zone manager 55 is, in the examples of FIGS. 2A-2C, implemented by virtualization zone management logic 85 in memory 80. In other words, virtualization zone manager 55 is a software application (i.e., virtualization zone management logic 85 comprises one or more software modules stored in memory 80 that are executable by processor 75). To this end, memory 80 may comprise read only memory (ROM), random access memory (RAM), magnetic disk storage media devices, optical storage media devices, flash memory devices, electrical, optical, or other physical/tangible (non-transitory) memory storage devices. The processor 75 is, for example, a microprocessor or microcontroller that executes instructions for the virtualization zone management logic 85. Thus, in general, the memory 80 may comprise one or more tangible computer readable storage media (e.g., a memory device) encoded with software comprising computer executable instructions and when the software is executed (by the processor 75) it is operable to perform the operations described herein in connection with virtualization zone manager 55.

Figure 3:
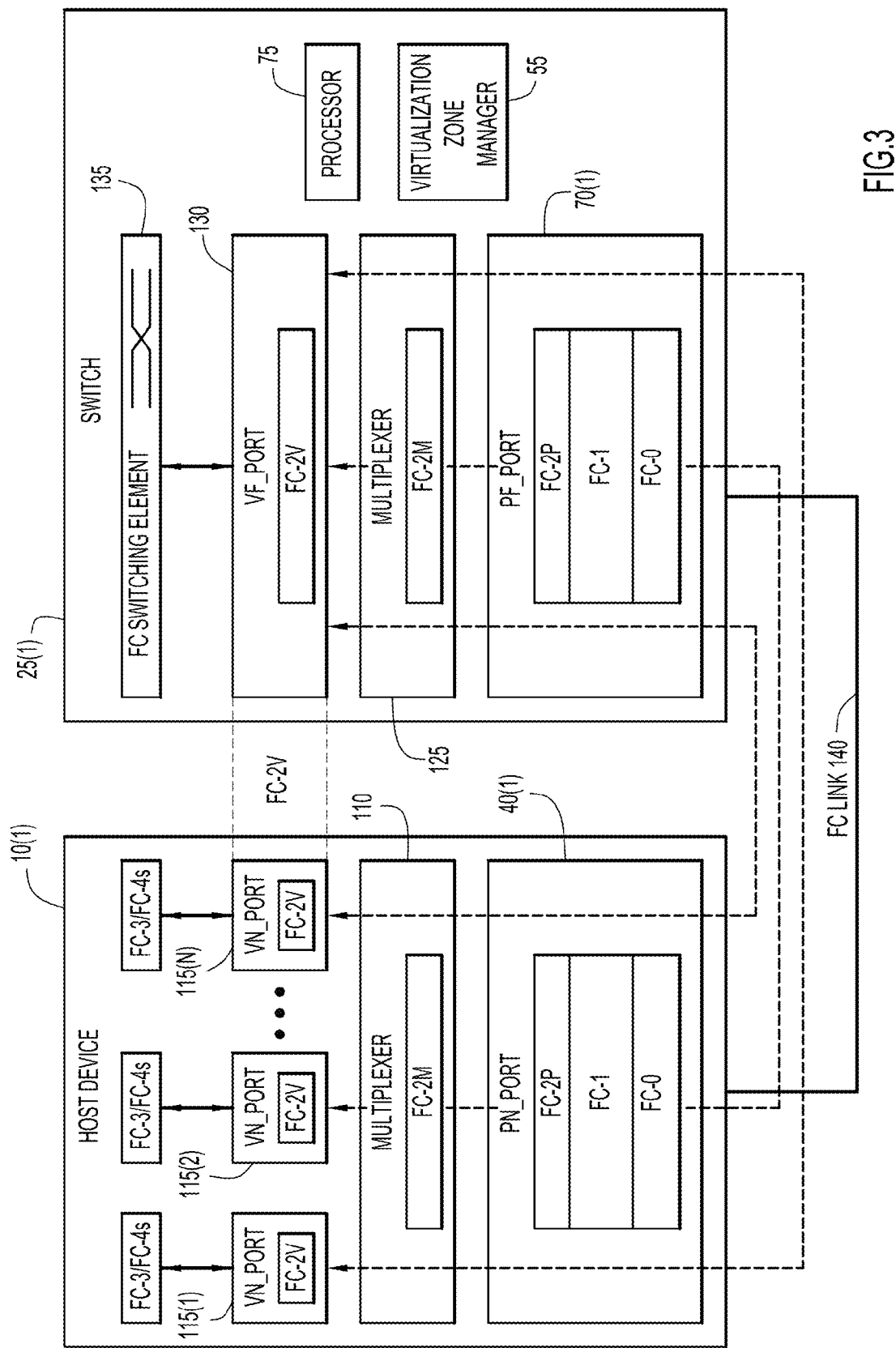
FIG. 3 is a block diagram of a host device and an FC switch in a SAN employing native FC as the transport protocol.

FIG. 3 is a block diagram of host device 10(1) connected to FC switch 25(1) in an example in which native FC is the underlying transport protocol for FC Fabric 20. Host device 10(1) comprises port 40(1), a multiplexer 110, and a plurality of virtualization blocks 115(1)-115(N). Switch 25(1) comprises a switch port 70(1), a multiplexer 120, a virtual Fibre Channel Interface or port (VF_Port), and an FC switching element 135. Host device 10(1) and switch 25(1) each also include a plurality of blocks associated with FC protocol sublevels. Table 1, below, provides an identification of these various FC protocol sublevels and an associated description.

TABLE 1

| | |
|---|---|
| FC-0 | The FC protocol level that encompasses the physical characteristics of the interface and data transmission media. |
| FC-1 | The FC protocol level that encompasses FC 8B/10B encoding, and transmission protocol |
| FC-2 | The FC protocol level that encompasses signaling protocol rules and the organization of data into frames, sequences, and exchanges. |
| FC-2M | The FC protocol sublevel that routes frames between virtual ports and Least Choice Firsts (LCFs). |
| FC-2P | The FC protocol sublevel that defines the rules and provides mechanisms that shall be used to transfer frames via the FC-1 level. |
| FC-2V | The FC protocol sublevel, that defines functions and facilities that a virtual port may provide for use by an FC-4 level, regardless of the FC-1 that is used. |
| FC-3 | The FC protocol level that defines a set of services that are common across multiple Nx_Ports of a node. FC-3 includes protocols for Basic Link Services, Extended Link Services and Hunt Groups. |
| FC-4 | The FC protocol level that encompasses the mapping of upper layer protocols (ULP) such as Internet Protocol (IP) and Small Computer System Interface (SCSI) to lower protocol layers (FC-0 through FC-3). An example of an FC-4 standard is the mapping of SCSI commands to Fibre Channel (FCP-3). |

In FIG. 3, multiple virtual ports 115(1)-115(N) are multiplexed (via multiplexer 110) through port 40(1) to switch port 70(1) of switch 25(1). As such, connections between the virtual ports 115(1)-115(N) are formed over an FC link 140. Switch 25(1) includes multiplexer 125 that multiplexes the virtual ports 115(1)-115(N) to VF_Port 130 and FC switching element 135.

Switch 25(1) also comprises processor 75 and virtualization zone manager 55. Virtualization zone manger 55 operates, as described above with reference to FIGS. 2A-2C, to manage the virtual ports for valid redundant Fabric Logins.

Figure 4:
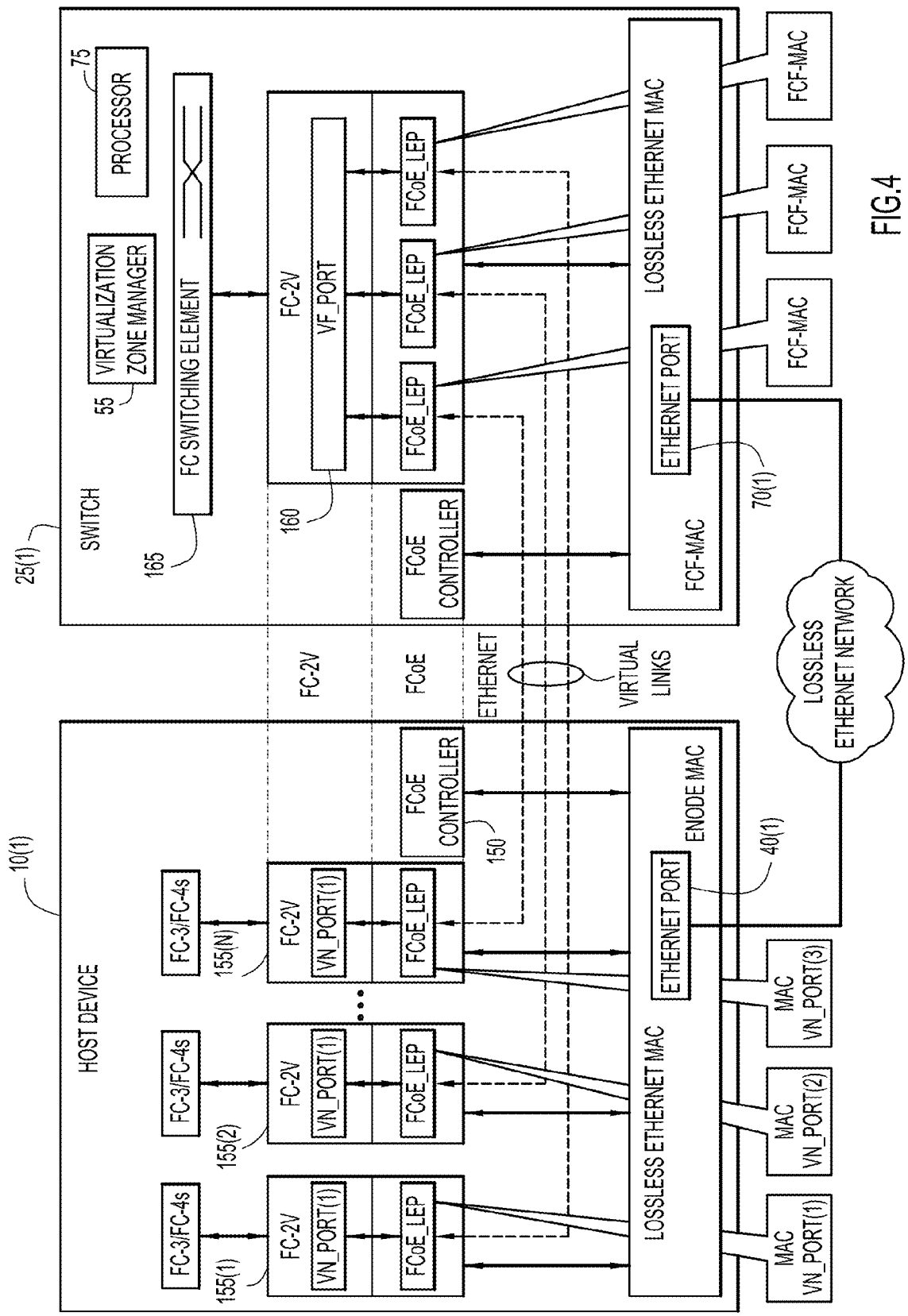
FIG. 4 is a block diagram of a host device and an FC switch in a SAN employing FC over Ethernet (FCoE) as the transport protocol.

FIG. 4 is a block diagram of host device 10(1) connected to FC switch 25(1) in an example in which Fibre Channel over Ethernet (FCoE) is the underlying transport protocol for FC network 5. Host device 10(1) comprises a port 40(1) that, as shown, is an Ethernet port. Host device 10(1) also comprises an FCoE controller 150, and a plurality of virtualization blocks 155(1)-155(N). Switch 25(1) comprises a switch port 70(1) that, as shown, is an Ethernet port. Switch 25(1) also comprises a VF_Port 160 and an FC switching element 165. Each of host device 10(1) and switch 25(1) also include a plurality of blocks associated with FC protocol sublevels. Table 1, above, provides an identification of these various FC protocol sublevels and an associated description.

In FIG. 4, multiple virtual ports 155(1)-155(N) are multiplexed through port 40(1) to switch port 70(1) of switch 25(1). Consequently, connections between the virtual ports 155(1)-155(N) are formed over a lossless Ethernet connection.

Switch 25(1) also comprises processor 75 and virtualization zone manager 55. Virtualization zone manager 55 operates, as described above with reference to FIGS. 2A-2C, to manage the virtual ports for valid redundant Fabric Logins.

Figure 5:
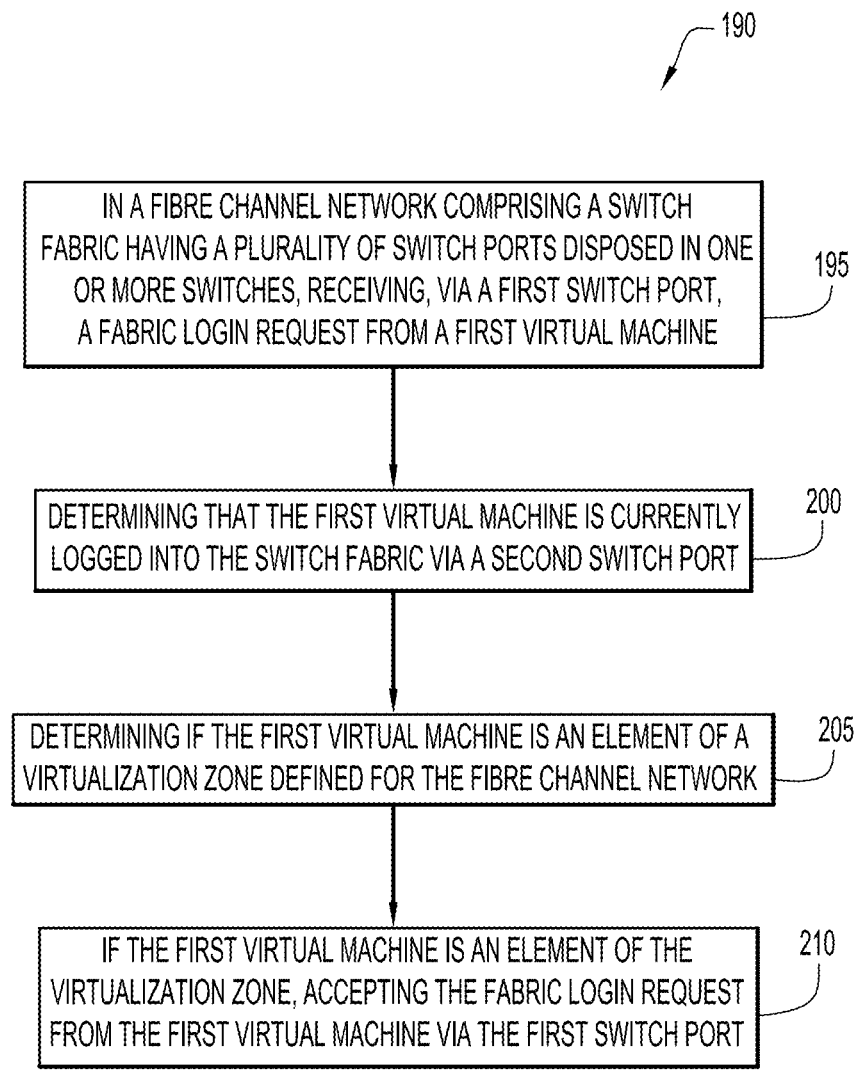
FIG. 5 is a flowchart of an example method implemented in accordance with virtualization zone management techniques.

FIG. 5 is a flowchart of a method 190 in accordance with an example virtualization zoning technique. Method 190 is performed in an FC network comprising a switched fabric having a plurality of switch ports disposed in one or more switches. At 195, a Fabric Login request is received from a first virtual machine via a first switch port. At 200, a determination is made as to whether the first virtual machine is currently logged into the switched fabric via a second switch port. At 205, a determination is made as to whether the first virtual machine is an element of a virtualization zone defined for the switched fabric. At 210, if the first virtual machine is an element of the virtualization zone, the Fabric Login request is accepted from the first virtual machine via the first switch port. If the virtual machine is not an element of the virtualization zone, the Fabric Login request from the first virtual machine via the first switch port may be rejected. Additionally, if the first virtual machine is an element of the virtualization zone, the first virtual machine is logged out of the switched fabric at the second port.

The above description is intended by way of example only.

What is claimed is:

1. A method comprising:
   in a Fibre Channel network comprising a switched fabric having a plurality of switch ports disposed in one or more switches, receiving, via a first switch port, a Fabric Login request from a first virtual machine;
   determining that the first virtual machine is currently logged into the switched fabric via a second switch port;
   determining if the first virtual machine is an element of a virtualization zone defined for the switched fabric; and
   if the first virtual machine is an element of the virtualization zone, accepting the Fabric Login request from the first virtual machine via the first switch port.

2. The method of claim 1, further comprising:
   rejecting the Fabric Login request from the first virtual machine via the first switch port when the virtual machine is not an element of the virtualization zone.

3. The method of claim 1, wherein the Fabric Login request includes a port name identifying the first virtual machine and the virtualization zone is defined to include a list of port names associated with the virtualization zone, and wherein determining if the first virtual machine is an element of a virtualization zone comprises:
   comparing the port name in the Fabric Login request to the list of port names associated with the virtualization zone.

4. The method of claim 1, further comprising:
   logging the first virtual machine out of the switched fabric at the second port when the first virtual machine is an element of the virtualization zone.

5. The method of claim 1, further comprising:
   receiving a definition of the virtualization zone comprising a virtualization attribute.

6. The method of claim 1, further comprising:
   receiving the Fabric Login request from the first virtual machine in a message formatted according to a Fibre Channel Authentication Protocol.

7. The method of claim 1, wherein receiving the Fabric Login request from a first virtual machine via the first switch port comprises:
   receiving the Fabric Login request on a switch port of a switch that also includes the second switch port.

8. The method of claim 1, wherein receiving the Fabric Login request from a first virtual machine via the first switch port comprises:
   receiving the Fabric Login request on a switch port of a switch that is different from a switch that includes the second switch port.

9. One or more computer readable storage memories encoded with software comprising computer executable instructions and when the software is executed operable to:
   in a Fibre Channel network comprising a switched fabric having a plurality of switch ports in one or more switches, receive, via a first switch port, a Fabric Login request from a first virtual machine;
   determine that the first virtual machine is currently logged into the switched fabric via a second switch port;
   determine if the first virtual machine is an element of a virtualization zone defined for the switched fabric; and
   accept the Fabric Login request from the first virtual machine via the first switch port when the first virtual machine is an element of the virtualization zone.

10. The computer readable storage memories of claim 9, further comprising instructions operable to reject the Fabric Login request from the first virtual machine via the first switch port when the virtual machine is not an element of the virtualization zone.

11. The computer readable storage memories of claim 9, wherein the Fabric Login request includes a port name identifying the first virtual machine and the virtualization zone is defined to include a list of port names associated with the virtualization zone, and wherein the instructions operable to determine if the first virtual machine is an element of a virtualization zone comprise instructions operable to:
   compare the port name in the Fabric Login request to the list of port names associated with the virtualization zone.

12. The computer readable storage memories of claim 9, further comprising instructions operable to:
   log the first virtual machine out of the switched fabric at the second port when the first virtual machine is an element of the virtualization zone.

13. The computer readable storage memories of claim 9, further comprising instructions operable to:
receive a definition of the virtualization zone having a virtualization attribute.

14. The computer readable storage memories of claim 9, further comprising instructions operable to:
receive the Fabric Login request from the first virtual machine in a message formatted according to a Fibre Channel Authentication Protocol.

15. An apparatus comprising:
first and second switch ports;
a memory; and
a processor coupled to the network interface and the memory, wherein the processor is configured to:
receive a Fabric Login request from a first virtual machine via the first switch port,
determine that the first virtual machine is currently logged into the switched fabric via the second switch port,
determine if the first virtual machine is an element of a virtualization zone defined for the switched fabric, and
accept the Fabric Login request from the first virtual machine via the first switch port when the first virtual machine is an element of the virtualization zone.

16. The apparatus of claim 15, wherein the processor is configured to reject the Fabric Login request from the first virtual machine via the first switch port when the virtual machine is not an element of the virtualization zone.

17. The apparatus of claim 15, wherein the Fabric Login request includes a port name identifying the first virtual machine and the virtualization zone includes a list of port names associated with the virtualization zone, and wherein the processor is configured to compare the port name in the Fabric Login request to the list of port names associated with the virtualization zone in order to determine if the first virtual machine is an element of a virtualization zone.

18. The apparatus of claim 15, wherein the processor is configured to log the first virtual machine out of the switched fabric at the second port when the first virtual machine is an element of the virtualization zone.

19. The apparatus of claim 15, wherein the virtualization zone includes a virtualization attribute.

20. The apparatus of claim 15, wherein the processor is configured to receive the Fabric Login request from the first virtual machine in a message formatted according to a Fibre Channel Authentication Protocol.

\* \* \* \* \*